United States Patent [19]

Garrett

[11] 4,452,380
[45] Jun. 5, 1984

[54] PORTABLE APPORTIONING APPARATUS

[76] Inventor: Arthur E. Garrett, Rte. 10, Box 204, Caldwell, Id. 83605

[21] Appl. No.: 519,535

[22] Filed: Aug. 1, 1983

[51] Int. Cl.³ .............................................. B65D 90/60
[52] U.S. Cl. ....................................... 222/335; 17/36
[58] Field of Search ............... 222/335, 319, 354, 249, 222/250, 339, 278, 452, 387; 73/252; 17/36, 39

[56] References Cited

U.S. PATENT DOCUMENTS 3,220,615 11/1965 Spatz ............................... 222/319 X Primary Examiner—Stanley H. Tollberg
Attorney, Agent, or Firm—Paul F. Horton

[57] ABSTRACT

Portable apportioning apparatus, readily attachable to a meat grinder or stuffer or similar product dispensing mechanism, including a product flow tube having an inlet and an outlet and an internal stop; a housing, defining a closed cavity, rotatingly engaging the flow tube, the cavity in fluid communication with a first opening cut-out of the wall of the flow tube above the internal stop and a second opening cut-out of the wall of the flow tube below the internal stop; and a rotatable apportioning baffle engaging the walls of the housing cavity to define two separate apportioning cavities. A semi-solid product, such as meat, flows from the grinder or stuffer through the inlet of the flow tube and through the top cut-out into one of the apportioning cavities causing rotational movement of the baffle to a predetermined apportioning stop. Movement of the baffle forces an apportioned amount of the product through the bottom cut-out and through the outlet of the flow tube where it may be packaged. Switches may be provided to activate the grinder or stuffer upon rotation of the housing or to deactivate the same upon selected apportionment by the baffle.

5 Claims, 5 Drawing Figures

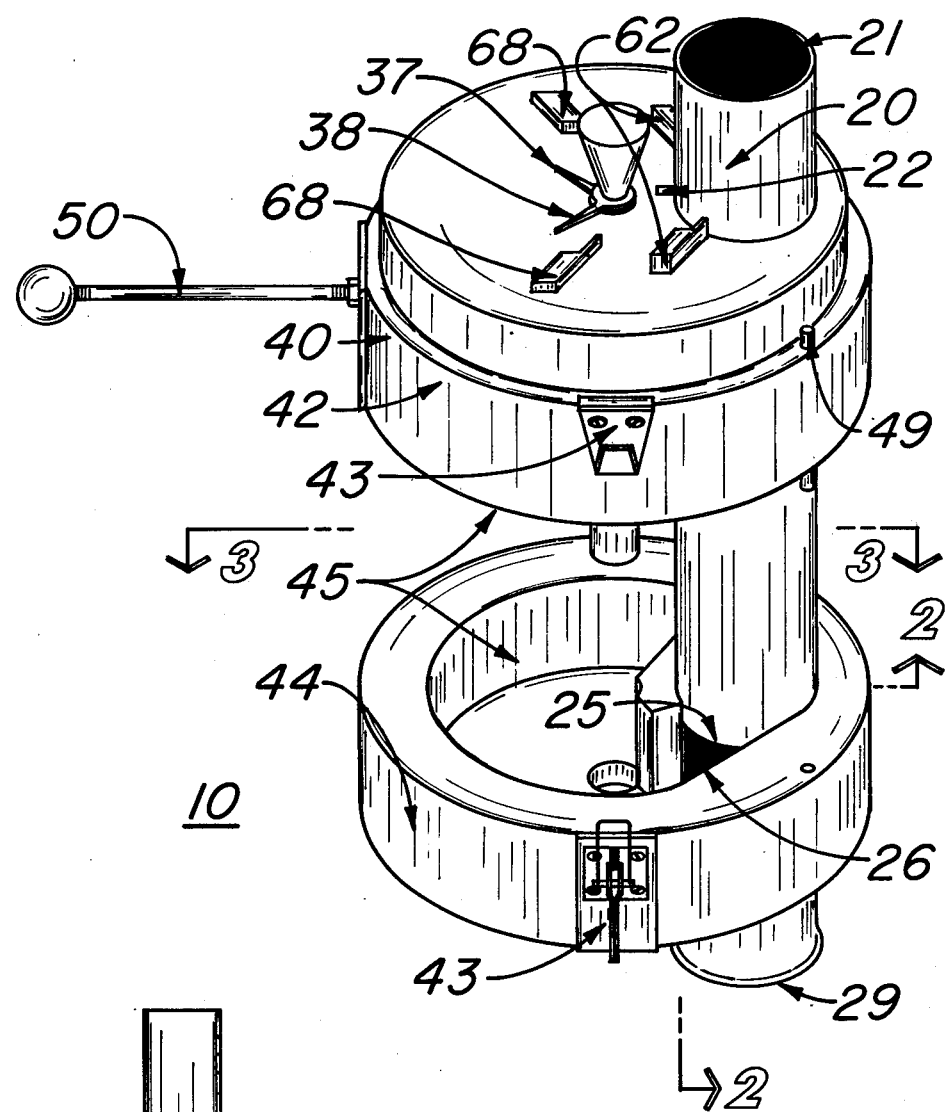
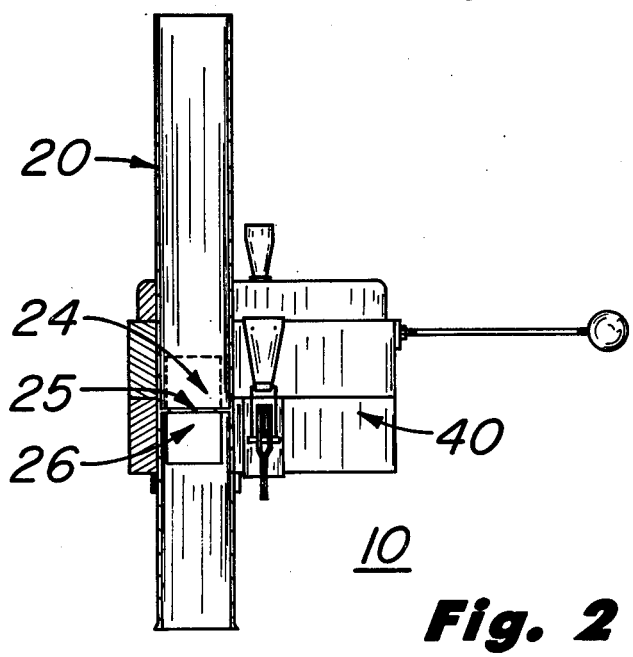
Fig. 1
Fig. 2

PORTABLE APPORTIONING APPARATUS

FIELD OF THE INVENTION

This invention relates, in general, to apportioning valves and in particular to portable apportioning apparatus for meat grinders and stuffers.

DESCRIPTION OF THE PRIOR ART

It is highly desirous in the trade to apportion meat or other semi-solid comestibles into packages of known weight or volume for sale. U.S. Pat. Nos. 2,593,889 and 2,908,424 issued to Kahl et al, and Illsley, respectively, typify standard measuring and dispensing devices. Such devices generally utilize fixed or floating pistons which do not lend themselves for convenient and complete cleaning, an essential goal in the food dispensing art; are generally equipped with high pressure rotating valves which emaciate and destroy the fiber of meats; are not portable for quick attachment to existing stuffers and grinders; and are inoperative to independently control output of existing stuffers and grinders.

SUMMARY OF THE INVENTION

The present invention comprises, generally, apportioning apparatus having a product flow tube; a housing which rotatably engages said flow tube; said housing cooperating with an internal baffle for the reception, apportionment, and dispensing of semi-solid products from an outlet of the flow tube. Switches, which are activated and deactivated by manual rotation of the housing or by selected rotation of the apportioning baffle, may also be included. A more comprehensive description of the invention may be found in the appended claims.

It is therefore a primary object of the present invention to provide a food apportioner which utilizes a stationary hollow flow tube directly attachable to an existing stuffer or grinder for low pressure, high volume apportioning.

It is also an objective of the present invention to provide apportioning apparatus having an apportioning baffle which is located within a separable housing for convenient cleaning.

It is a further object of the present invention to provide an apportioner which is portable and readily attachable to existing meat stuffers and grinders.

It is also an object of the present invention to provide apportioning apparatus with switching mechanisms to automatically start and stop dispensing apparatus with which it is attached.

Additional objects and advantages will become apparent and a more thorough and comprehensive understanding may be had from the following description taken in conjunction with the accompanying drawings forming a part of specification.

BRIEF DESCRIPTION OF THE DRAWINGS

FIG. 1 is an elevated exploded perspective view of a preferred embodiment of the present invention.

FIG. 2 is a side elevational view, partly in section, showing the apparatus as attached to an outlet part of a meat stuffer.

DETAILED DESCRIPTION OF THE INVENTION

Figure 3:
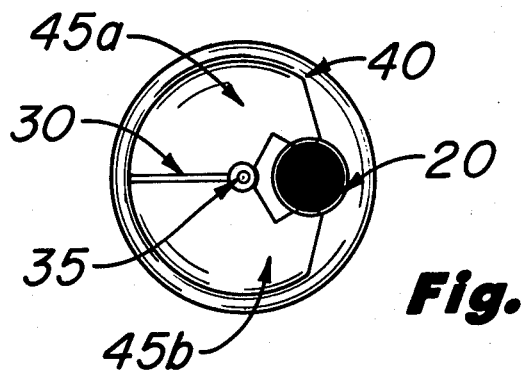
FIG. 3 is a sectional view taken along lines 3—3 of FIG. 2.

Referring now to the drawings, an embodiment to be preferred of apportioning apparatus 10, made according to the present invention is disclosed. Apportioning apparatus 10, in the preferred embodiment, includes generally a product flow tube 20; a housing 40 adapted to rotatably engage the flow tube; and a baffle 30, contained within the housing and cooperating with the housing for selected apportionment of the product to be utilized.

Figure 4:
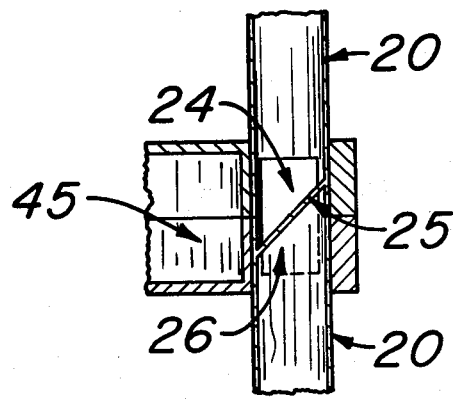
FIG. 4 is a sketch showing a preferred embodiment of the internal stop and cut-outs of the product flow tube of the present invention.

Flow tube 20 is preferably constructed of stainless steel, and in the drawing shown has an inside diameter of 2 inches and a length of 16 inches. The flow tube is provided with a stop or plug 25 which seals the top portion of the tube from the lower portion. The stop may be located transverse to the tube, as shown in FIG. 2, or may be obliquely located, as is shown to advantage in FIG. 4. Flow tube 20 is provided at its upper-most end with an inlet port 21 which is coupled with the output of a dispenser such as a meat grinder or stuffer, not shown. Conventional means such as a clasp lock, threaded connection, or the like, may be used for connecting apparatus 10 to the dispenser. The flow tube is provided at its lowermost end with an outlet port 29 for dispensing of the semi-solid product. The flow tube is further provided with a pair of opposing cut-outs 24 and 26, located on opposing sides of flow tube 20 from one another and located on opposing sides of internal stop 25 from one another. Both top cut-out 24 and bottom cut-out 26 may be of any desired size to as to effectuate simultaneous opening and closure by rotation of housing 40 about flow tube 20. In the embodiment shown in FIGS. 1 and 2, each cut-out has a width of one and one-half inches and a height of one and three eighths inches.

Housing 40 may be constructed of any suitable material, a high density plastic such as USDA approved polyethylene. In use with the two-inch flow tube, a housing having an outside diameter of seven inches and an inside diameter of six inches and an exterior height of approximately six inches is preferred. Housing 40 includes a top member 42 and a bottom member 44, each of which are separable from one another for convenient cleaning and repair. The top and bottom members are aligned for registry by a pin 49 downwardly extending from the sidewall of top member 42, the pin being insertable into a hole, not shown, defined in the sidewall of lower member 44 of the housing. Members 42 and 44 are held in closed position by latching means 43 which may consist of any conventional latch means. Upper and lower members 42 and 44 of housing 40 engage flow tube 20 by means of appropriate bearings so as to be rotatable thereon. When closed and latched, housing members 42 and 44 define an apportionment cavity 45 which is selectively and simultaneously open and in fluid communication with cut-outs 24 and 26 of flow tube 20 upon rotation of the housing relative to the flow tube. Handle 50 is used to rotate the housing.

Baffle 30, as shown to advantage in FIG. 3, is affixed to a central shaft 35 rotatably mounted in respective ends of housing members 42 and 44 and is of sufficient height and length to form an effective product retaining seal in its rotational engagement with the interior top, bottom, and sidewalls of members 42 and 44. The baffle divides cavity 45 into a pair of apportionment and dispensing cavities 45a and 45b which are adjustable in size as will hereinafter be explained. Each of said cavities is selectively in fluid communication with one of said flow tube cut-outs 24 or 26 so that a semi-solid product injected through inlet port 21 and through top cut-out 24 of flow tube 20 into one of the cavities 45a or 45b will fill the cavity with a pre-determined amount of product, simultaneously rotating the baffle to empty the other cavity through cutout 26 and through outlet port 29 of the flow tube.

Figure 5:
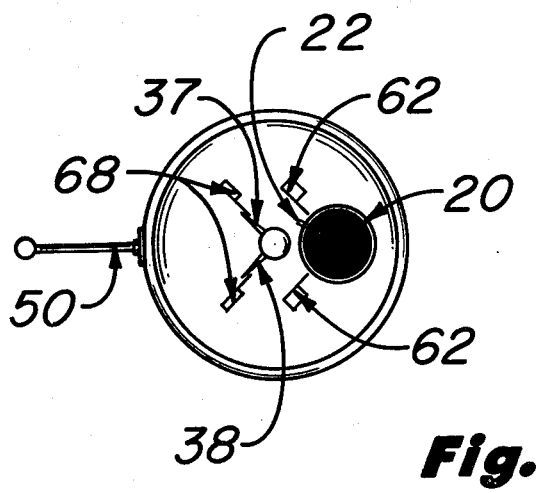
FIG. 5 is a plan view of one embodiment of the present invention.

In the preferred embodiment, as shown in FIGS. 1 and 5, apportioner 10 includes a fixed baffle stop 37 and an adjustable baffle stop 38 which rotate with the baffle and which engage one of two cut-off switches 68, all carried upon the top surface of the housing, to deactivate the grinder or stuffer, not shown, to which apportioner 10 is attached. Selective adjustment of stop 38 relative to stop 37 permits accurate determination of baffle movement and therefore amount of apportionment. Apportioner 10 also includes a pair of grinder or stuffer activator switches 62, also carried by housing 40, which are activated by a contact 22 mounted on product flow tube 20 when housing 40 is rotated by handle 50 to cause engagement between the contact and one of the switches 62.

In operation, apportioner 10 is first coupled to a meat grinder or stuffer or other semi-solid dispenser, not shown, with inlet port 21 of the apportioner flow tube 20 connected to the output of such dispenser and with appropriate electrical connections in place. Amount of meat or other product to be apportioned is then determined by selective setting of adjustable baffle stop 38. Housing 40 is then rotated about flow tube 20 in either direction by handle 50 until contact 22 engages one of the switches 62 which activates a grinder, for example. The grinder continues to operate, with the handle 50 held in position, causing meat to flow through inlet port 21, through tube 20, through top cut-out 24, and into cavity 45a, for example, filling the cavity and causing baffle 30 to rotate until baffle stop 38 contacts a cut-off switch 68 to deactivate the grinder. Housing 40 is then rotated in the opposite direction by handle 50 until once again the grinder is activated by contact 22 engaging the other activation switch 62. Meat is again forced through inlet port 21, tube 20 and into second cavity 45b filling the second cavity and forcing baffle 30 to rotate in the opposite direction which simultaneously empties cavity 45a through bottom cut-out 24, through flow tube 20, and out the outlet port 29 for packaging. The grinder is once again deactivated as baffle stop 37 contacts the second cut-off switch 68. The process is then repeated, as desired, with an exact and selected amount of meat dispensed each time.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus attachable to a product dispensing mechanism for the apportioning and dispensing of a fluid product comprising:
   a product flow tube having an inlet and an outlet opening, an internal stop, a first wall cut-out above and adjacent said stop, and a second wall cut-out opening below and adjacent to said stop;
   a housing sealingly and rotatably engaging said product flow tube, said housing defining an enclosed cavity selectively in fluid communication with each of the cut-outs of said product flow tube, and;
   a rotatable baffle contained within and sealingly engaging the interior walls of said housing to define two separate apportioning cavities therein, each cavity selectively in fluid communication with one of said cut-outs whereby a fluid product injected through the inlet of said flow tube and through said first wall cut-out into one of the apportioning cavities, fill said cavity with a predetermined amount of said product dependent upon the degree of rotation of said baffle while simultaneously emptying a predetermined amount of said product from the second apportioning cavity through the second wall cut-out and through the outlet of said product flow tube.

2. The apparatus as described in claim 1 wherein said housing includes an upper member and a lower member separable from one another and held together by latch means.

3. The apparatus as described in claim 1 further comprising first switch means operable to selectively activate and deactivate the product dispensing mechanism upon selective rotation of said housing about said flow tube.

4. The apparatus as described in claim 1 further comprising second switch means operable to deactivate said product dispensing mechanism upon selective rotation of said baffle relative to said housing.

5. The apparatus as described in claim 1 wherein said internal stop of said product flow tube is inclined relative to the longitudinal axis of said product flow tube.

* * * * *